(12) United States Patent
Dimanov et al.

(10) Patent No.: US 11,449,578 B2
(45) Date of Patent: Sep. 20, 2022

(54) METHOD FOR INSPECTING A NEURAL NETWORK

(71) Applicant: Botty Todorov Dimanov, Sofia (BG)

(72) Inventors: Botty Todorov Dimanov, Sofia (BG); Mateja Jamnik, Cambridge (GB)

(73) Assignee: Botty Todorov Dimanov, Sofia (BG)

( * ) Notice: Subject to any disclaimer, the term of this patent is extended or adjusted under 35 U.S.C. 154(b) by 248 days.

(21) Appl. No.: 16/585,635

(22) Filed: Sep. 27, 2019

(65) Prior Publication Data

US 2021/0097132 A1 Apr. 1, 2021

(51) Int. Cl.
*G06F 17/18* (2006.01)
*G06K 9/62* (2022.01)
*G06N 3/04* (2006.01)
*G06N 3/08* (2006.01)

(52) U.S. Cl.
CPC ........... *G06F 17/18* (2013.01); *G06K 9/6265* (2013.01); *G06N 3/04* (2013.01); *G06N 3/08* (2013.01)

(58) Field of Classification Search
CPC ...... G06F 17/18; G06K 9/6265; G06K 9/627; G06K 9/6217; G06K 9/6262; G06N 3/04; G06N 3/08; G06N 20/00; G06N 3/02
USPC .................... 702/188; 706/12, 15, 20, 25, 31
See application file for complete search history.

(56) References Cited

U.S. PATENT DOCUMENTS

| | | | | |
|---|---|---|---|---|
| 5,521,814 A * | 5/1996 | Teran | ............. | G05B 13/027 |
| | | | | 422/213 |
| 6,490,573 B1 * | 12/2002 | Njemanze | ............. | G06N 3/04 |
| | | | | 706/19 |
| 7,617,415 B1 * | 11/2009 | Kadakia | ............. | G06F 11/3676 |
| | | | | 714/26 |
| 10,157,045 B2 * | 12/2018 | Venkataramani | .... | G06N 3/0454 |
| 10,394,907 B2 * | 8/2019 | Huang | ............. | G06F 16/289 |
| 2005/0105097 A1 * | 5/2005 | Fang-Yen | ......... | G01B 9/02071 |
| | | | | 356/497 |
| 2016/0092765 A1 * | 3/2016 | Chilimbi | ............. | G06N 3/084 |
| | | | | 706/25 |
| 2018/0067941 A1 * | 3/2018 | Chambers | ............. | G06F 16/211 |
| 2018/0293102 A1 * | 10/2018 | Ray | ............. | G06T 1/20 |
| 2018/0373986 A1 * | 12/2018 | Rainwater | ............. | G06F 11/36 |
| 2019/0146482 A1 * | 5/2019 | Celia | ............. | G06N 3/02 |
| | | | | 702/188 |

(Continued)

FOREIGN PATENT DOCUMENTS

WO WO-2016150472 A1 * 9/2016 ........... G06K 9/4628

*Primary Examiner* — Jeffrey P Aiello
(74) *Attorney, Agent, or Firm* — Sterne, Kessler, Goldstein & Fox P.L.L.C.

(57) ABSTRACT

Broadly speaking, embodiments of the present techniques provide methods for inspecting a neural network, such that a neural network can be made more transparent. The inspection is performed with respect to each decision or output made by the neural network. The method comprises outputting a dependency graph, for each inspection/decision. Each dependency graph shows which neurons are used to make each individual decision made by the neural network, and how those neurons interact with or relate to each other. Specifically, the dependency graph shows the dependencies between neurons in adjacent layers. By understanding which neurons are used to make individual decisions, and the dependencies between neurons, the neural network can be better understood, audited, optimised, and debugged, for example.

20 Claims, 8 Drawing Sheets

(56) References Cited

U.S. PATENT DOCUMENTS

| | | | |
|---|---|---|---|
| 2019/0340511 A1* | 11/2019 | Yous | G06N 3/0454 |
| 2019/0340945 A1* | 11/2019 | Malhotra | G06N 5/022 |
| 2019/0361855 A1* | 11/2019 | Rogynskyy | G06F 16/2365 |
| 2020/0097387 A1* | 3/2020 | Loyola | G06F 11/3692 |
| 2020/0202214 A1* | 6/2020 | Peranandam | G06N 3/04 |
| 2020/0218959 A1* | 7/2020 | Srinivasa | G06N 3/049 |
| 2020/0250409 A1* | 8/2020 | Hu | G06K 9/6256 |
| 2020/0258509 A1* | 8/2020 | Bharadwaj | H04L 51/02 |
| 2020/0293367 A1* | 9/2020 | Andrei | G06N 3/08 |
| 2020/0293910 A1* | 9/2020 | Kate | G06F 16/2393 |
| 2021/0012212 A1* | 1/2021 | Sikka | G06N 3/0481 |
| 2021/0097132 A1* | 4/2021 | Dimanov | G06K 9/627 |

* cited by examiner

METHOD FOR INSPECTING A NEURAL NETWORK

BACKGROUND

Field

The present techniques generally relate to systems and methods for inspecting a neural network, and in particular relate to methods of making a neural network more transparent so that it can be more easily audited, debugged and understood.

Background

Deep Neural Networks (DNNs) are difficult to interpret due to their highly complex non-linear and interconnected nature. The lack of transparency may result in a three-fold problem. First, it inhibits adoption, especially in industries under heavy regulation and with a high cost of errors. Second, it prevents the utilisation of the insights gained from the models for further knowledge discovery. Third, it makes debugging existing models difficult, which hampers development progress.

The present applicant has identified the need for techniques to improve the transparency and interpretability of existing neural networks.

BRIEF SUMMARY

In a first approach of the present techniques, there is provided a computer-implemented method of inspecting a neural network that receives a plurality of data items as an input and provides an output decision for each of the plurality of data items, the method comprising: receiving a subset of the plurality of data items that are all associated with the same output decision; identifying, using at least one processor, a plurality of neurons in each layer of the neural network used to make the output decision for each received data item; assigning, using the at least one processor, a relevance value to each identified neuron used to make the output decision for each received data item; identifying for each received data item, using the relevance value, each neuron with a high relevance value; determining, across the received subset of data items, an occurrence frequency of each neuron with a high relevance value; and outputting, for the output decision made by the neural network, a dependency graph showing dependencies between neurons in adjacent layers of the neural network using the determined occurrence frequencies, the dependency graph enabling inspection of the neural network.

In other words, the method enables a neural network to be inspected and made more transparent and interpretable by producing dependency graphs that show which neurons are used to make each individual decision made by the neural network, and how those neurons interact with or relate to each other. Specifically, the dependency graph shows the dependencies between neurons in adjacent layers. By understanding which neurons are used to make individual decisions, and the dependencies between neurons, the neural network can be better understood, audited, optimised, and debugged, for example.

The method provides statistical topological interpretability. That is, properties of a neural network may be analysed as a directed graph over various inputs to produce a dependency graph between neurons. The dependency graph highlights the relationships between adjacent layers that are pertinent to the decision, and how these relationships are formed in each layer and across all layers to form a feature representation.

The step of identifying a plurality of neurons in each layer of the neural network may comprise: identifying a plurality of neurons in an output layer of the neural network; and identifying, based on the identified neurons in the output layer, a plurality of neurons in a subsequent layer of the neural network. More generally, the step of identifying a plurality of neurons in each layer of the neural network may comprise: using a plurality of neurons identified in a first layer of the neural network to identify a plurality of neurons in a second layer of the neural network. That is, the method may identify the neurons used to make a particular decision in a layer-by-layer manner.

The process may begin by selecting a neuron in the output layer of the neural network (also known as the "top layer"), which produces the final decision. Ideally, the selected neuron is a neuron of the correct class. For example, if the decision being made by the neural network is determining whether or not an image shows a shark (class), then the selected neuron (also referred to herein as the "target neuron") may be the neuron in the output layer which is concerned with the same class, i.e. identifying sharks. Alternatively, the selected neuron may be in a class that is typically confused with sharks, e.g. fish. This may be useful to perform error analysis.

The step of identifying a plurality of neurons in each layer of the neural network may comprise: determining a function used to define each neuron; determining a gradient of the function and a magnitude of the gradient for each neuron; and identifying, using the magnitude of the gradient, a neuron as making the decision for each data item.

The step of assigning a relevance value to each identified neuron may comprise: assigning a numerical relevance value to each identified neuron used to make the decision. The numerical value may be assigned by approximating the activation of a neuron based on its input neurons using a linear function. For example, if the input neurons are n1, n2, n3 and the target neuron (the neuron for which a numerical relevance value is to be assigned) is t, the approximating function may be $$t = v1*n1 + v2*n2 + v3*n3$$

where v1, v2 and v3 are the numerical values. The approximation may be achieved by computing a first-order Taylor expansion, as outlined in section 3 and equations 1 and 2 of the following publication, which is incorporated herein by reference in its entirety: "Step-Wise Sensitivity Analysis: Identifying Partially Distributed Representations for Interpretable Deep Learning" (available here: https://openreview.net/forum?id=SyeBqsRctm). The approximating function may be any other suitable method for neuron attribution.

The step of identifying each neuron with a high relevance value may comprise: performing statistical analysis, using the relevance values of each identified neuron, to identify each neuron with a high relevance value. Generally speaking, the neurons which are considered to be most relevant in the making of a decision (i.e. have a high relevance value) are those which have to be changed the least to affect the activation of a neuron in an adjacent, higher layer the most. In other words, the dependency graphs for interpreting neural networks that are produced by the present techniques can be seen as performing a sensitivity analysis between a higher layer and a lower layer. In some cases, the sensitivity analysis may be performed only between a higher layer and a lower layer, and not across the whole of the neural network. The dependency graphs for interpreting neural networks produced by the present techniques may be considered a framework that enables statistical topological interpretability. That is, the techniques enable analysis of the properties of a neural network as a directed graph over various inputs to produce a dependency graph between neurons, where the dependency graph highlights the relationships between adjacent layers that are pertinent to making a particular decision, and how these relationships are formed in each layer and across all layers to form a feature representation.

A large positive relevance value (i.e. a high positive relevance value) means that the identified neuron contributes substantially to the activation of a neuron in a higher layer, while a large negative relevance value (i.e. a high negative relevance value) means that the identified neuron inhibits the activation of a neuron in a higher layer. The ability to identify the positively and negatively contributing neurons in a layer-by-layer manner is the first step towards understanding the internal representation structure of the neural network.

The statistical analysis may comprise: calculating, using the relevance values of each identified neuron, an interquartile range; and identifying each neuron which lies outside of the interquartile range as having a high relevance value. In an example, identifying each neuron that has a high relevance value comprises identifying each neuron in a range that is equal to 1.5 multiplied by the interquartile range.

Alternatively, the statistical analysis may comprise: determining, using the relevance values of each identified neuron, a Laplace distribution; and identifying each neuron which lies within five percent of the peak of the Laplace distribution as having a high relevance value.

The step of identifying each neuron with a high relevance value may comprise: assigning a first binary value to each neuron indicating whether the neuron has a high relevance; and assigning a second binary value to each neuron indicating whether the neuron is positive or negative. As explained above, a high positive relevance value means that the identified neuron contributes substantially to the activation of a neuron in a higher layer, while a high negative relevance value means that the identified neuron inhibits the activation of a neuron in a higher layer. The second binary value indicates whether the neuron contributes towards reaching a particular output decision (e.g. the image shows a shark) or against reaching the particular output decision. That is, a positive value indicates the neuron's influence is positive on reaching a particular output decision, while a negative value indicates the neuron's influence is negative/against reaching the particular output decision.

The step of determining an occurrence frequency may comprise: outputting a bar chart representing the occurrence frequency of each neuron with a high relevance value for each of the plurality of data items. This may make it simpler for a human user to visualise which neurons have a high relevance value and occur most frequently, i.e. to visually identify the neurons which are most often used to make the decision.

The step of outputting a dependency graph may comprise: selecting, using the determined occurrence frequency, the neurons with a high relevance value which occur most frequently; and generating, using the selected neurons, a dependency graph between the neurons of each layer of the neural network for the decision made by the neural network.

The method may further comprise: identifying a class of the decision made by the neural network; and comparing the outputted dependency graph with a dependency graph created for at least one other class of decision. The comparison may be used to determine whether any neurons are shared between the classes.

The method may be used to inspect any type of neural network. For example, the neural network may be any one of: a recurrent neural network, a feed forward neural network, and a convolutional neural network. The method may be used to inspect any neural network which may be formed of a combination of any of: a recurrent neural network, a feed forward neural network, and a convolutional neural network.

The plurality of data items may be any one of: images, audio files, and text files.

Inspection of the neural network may be used for any reason, such as: optimisation of the neural network, debugging the neural network, monitoring the neural network, adjusting the neural network in view of new information, and auditing the neural network.

In a second approach of the present techniques, there is provided a computer-implemented method of inspecting a neural network used for image classification, where the neural network receives a plurality of images as an input and provides an image classification decision for each of the plurality of images, the method comprising: receiving a subset of the plurality of images associated with the same (a specific) image classification decision; identifying, using at least one processor, a plurality of neurons in each layer of the neural network used to make the image classification decision for each received image; assigning, using the at least one processor, a relevance value to each identified neuron used to make the image classification decision for each received image; identifying for each received image, using the relevance value, each neuron with a high relevance value; determining, across the received subset of images, an occurrence frequency of each neuron with a high relevance value; and outputting, for the decision made by the neural network, a dependency graph showing dependencies between neurons in adjacent layers of the neural network using the determined occurrence frequencies, the dependency graph enabling inspection of the neural network.

The method may further comprise identifying, using the outputted dependency graph, each feature used to make the image classification decision, and the neurons which encode each feature.

In a related approach of the present techniques, there is provided a non-transitory data carrier carrying processor control code to implement any of the methods, processes and techniques described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be implemented using multiple processors or control circuits. The present techniques may be adapted to run on, or integrated into, the operating system of an apparatus.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

BRIEF DESCRIPTION OF THE DRAWINGS

Implementations of the present techniques will now be described, by way of example only, with reference to the accompanying drawings, in which.

DETAILED DESCRIPTION OF THE DRAWINGS

Figure 1:
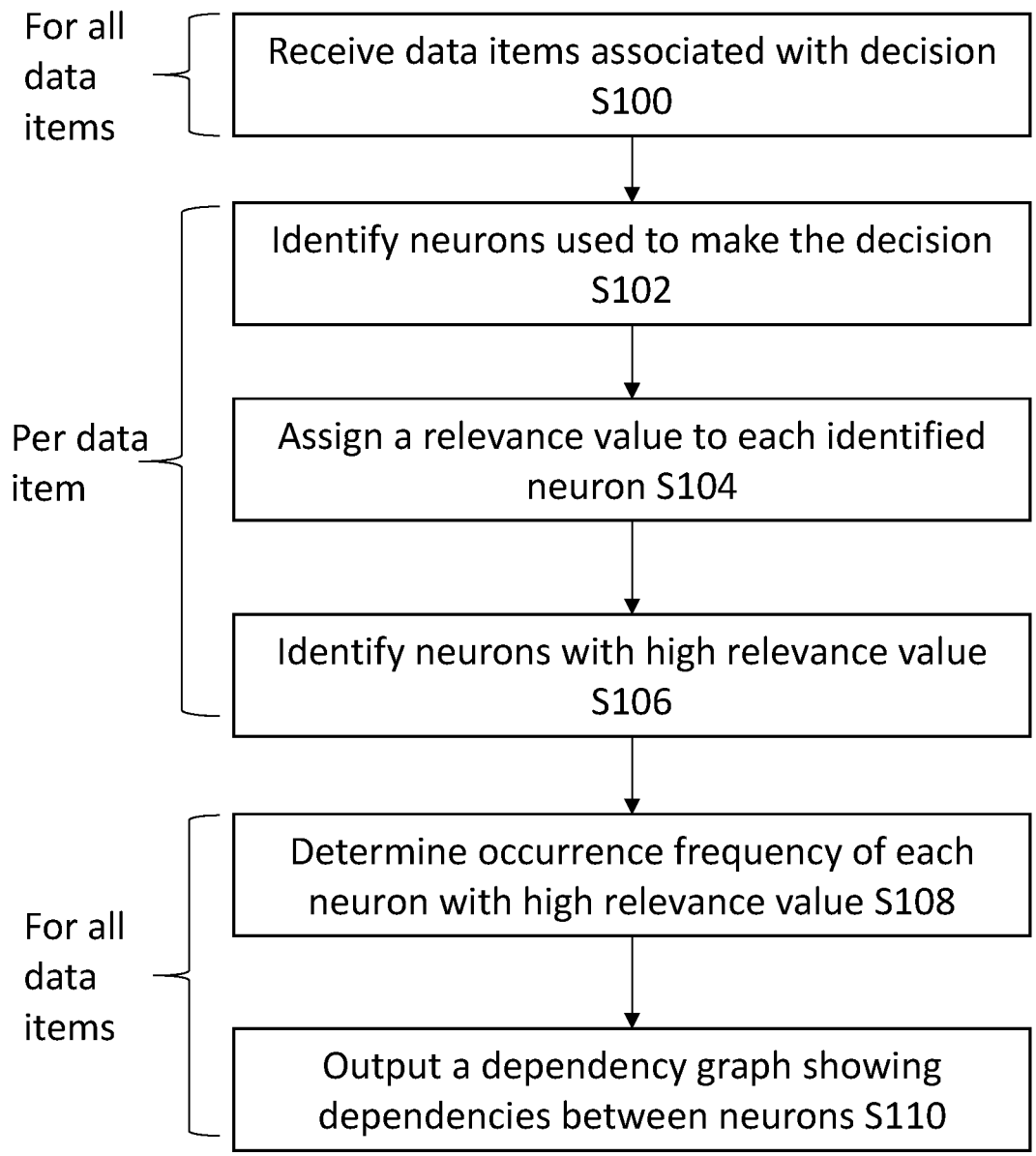
FIG. 1 is a flowchart of example steps to inspect a neural network.

Broadly speaking, embodiments of the present techniques provide methods for inspecting a neural network, such that a neural network can be made more transparent. The inspection is performed with respect to each decision or output made by the neural network. For example, for a neural network which is used to perform image classification, the neural network may be inspected with respect to each class identified by the network (e.g. cat, dog, shark, plane, computer, etc.), in order to determine how each image classification decision is made and whether any localised, i.e. class-specific, issues exist. The method comprises outputting a dependency graph, for each inspection/decision. Each dependency graph shows which neurons are used to make each individual decision made by the neural network, and how those neurons interact with or relate to each other. Specifically, the dependency graph shows the dependencies between neurons in adjacent layers. By understanding which neurons are used to make individual decisions, and the dependencies between neurons, the neural network can be better understood, audited, optimised, and debugged, for example.

An advantage of the present techniques is the granularity with which it can illuminate the internal workings of a neural network. The method may generate a directed acyclic graph that spans the entire network, which is termed a "dependency graph" herein because it increases the understanding of exactly how the activation of higher output layers depends on lower input layers. It illustrates how the input is transformed in each of the network's layers and highlights "paths" that, when followed, identify the building blocks of higher level features. For example, if a neural network is used to perform image classification and can identify whether an image contains a shark, the present techniques may make it possible to say that the concept of a shark is encoded within the neural network as a combination of features including a fin, a body, and a tail. The present techniques may make it possible to determine how a shark is encoded within the neural network relative to how a fish is encoded within the same network, which may enable the neural network to be better understood and any errors to be debugged. (For example, is something that is identified as having a fin, body and tail always a shark or is it a fish? What makes the neural network decide if the image is of a fish or a shark?)

The present techniques may take a Deep Neural Network (of any kind), together with one or more datapoints (or data items), and return the neurons in the network that are the most important for that network when computing the classification/regression decisions for these datapoints.

One of the advantages of this approach is that it relies on both a specific set of data (input datapoints), and a trained model, showing how the trained model uses that specific data. This sets it apart from many other approaches, which inspect datasets and models disjointly. Accordingly, the present techniques may be used for a wide range of tasks. For example, by producing a dependency graph for datapoints of a set of classes a deep neural network (DNN) was trained on, it is possible to identify the subset of the DNN that is used when making decisions for these classes. Thus, it may be possible to extract/reuse this network subset for other classification tasks (in principle). For example, a network may be trained to recognise digits 0, 1, 2, and now it is desired to only want to recognise digits 0, 1. It may be possible to extract the dependency graph generated using points 0, 1, from the original network, as this is the network subset required to work with these two classes. This is invaluable in transfer learning applications, where determining which neurons store class-specific information is required.

The present techniques may also be used to produce one dependency graph per datapoint (i.e. data item, e.g. an image), and compare them. For example, it may be possible to use distributions of dependency graphs to identify class datapoints the network finds unusual. For instance, assume a DNN is trained to classify digits 0, 1. The present techniques may take all datapoints for digit 0, and generate a dependency graph for each datapoint individually. It is expected that most dependency graph will look similar (as the DNN uses similar neurons/features for classifying the given class). However, by comparing the dependency graphs produced for each individual data item, dependency, graphs that are "unusual" (i.e. are very different from the majority) indicate data items the network finds unusual, which might be misclassified. This can be used to debug the DNN and eliminate hidden biases. For example, this may reveal specific features that are common to all of the data items that are deemed "unusual", which were not previously accounted for in the training of the DNN.

The present techniques may also be used to generate and compare dependency graphs for training data and test data. It is expected that a DNN will have similar dependency graphs for both training and test data. By comparing dependency graphs for training data and test data, it may be possible to identify domain shift (i.e. test data is drawn from a different distribution than the training data), in case their dependency graphs look radically different.

FIG. 1 is a flowchart of example steps to inspect a neural network that receives a plurality of data items as an input and provides an output decision for each of the plurality of data items. The steps may be performed by a computer, i.e. by software, hardware or a combination of software and hardware. Once a user has decided to inspect a neural network, the user also needs to decide what decision of, or output made by, the neural network they wish to inspect and better understand. The method begins by receiving or obtaining a subset of the plurality of data items that are all associated with the same particular output decision made by the neural network (step S100).

For example, a user may wish to understand how a neural network used for image classification determines if an image contains a shark. In this case, the plurality of data items may be a plurality of images or image files that the neural network has already classified as containing/showing a shark.

In another example, the inspection may be of a neural network which is used to predict songs or sounds that a user may like. In this case, the plurality of data items may include songs, song elements, or song characteristics which the neural network has predicted that a user may like (where the prediction may be based on songs, song elements, or song characteristics that a user has indicated they like/dislike and their personal characteristics, e.g. age, gender, etc.)

In another example, the inspection may be of a neural network which is used to predict sentiment of a phrase, text or news story or news headline. In this case, the plurality of data items may include phrases, text, news stories/articles, news headlines, or snippets from news articles, which the neural network has already associated with a particular sentiment. The neural network may be inspected to determine how the decision about sentiment is made. For example, if the plurality of data items have all been characterised as relating to a positive sentiment, then the inspection may help to determine how the positive sentiment is determined (e.g. presence of particular words, tone, etc.) In another example, the plurality of data items may have been categorised as relating to a particular theme (e.g. religion, politics, innovation, medicine, etc.). The inspection therefore may help to determine how the theme of the text-based content is determined (e.g. presence of key words).

The plurality of data items which are associated with the chosen decision may be obtained from a database or storage containing data items that have been processed by the neural network. Alternatively, new data items may be provided to the neural network for processing with respect to the chosen decision, and the data items which are associated with the decision (e.g. "contain a shark", etc.) may be used as the plurality of data items that are used to inspect the neural network.

Once the data items associated with the decision have been obtained, the method comprises, identifying, using at least one processor, a plurality of neurons in each layer of the neural network used to make the decision for each received data item (step S102). This step S102 may comprise first selecting a neuron in the output layer of the neural network (also known as the "top layer"), which produces the final decision. Ideally, the selected neuron is a neuron of the correct class. For example, if the decision being made by the neural network is determining whether or not an image shows a shark (class), then the selected neuron (also referred to herein as the "target neuron") may be the neuron in the output layer which is concerned with the same class, i.e. identifying sharks. Alternatively, the selected neuron may be in a class that is typically confused with sharks, e.g. fish.

Step 102 may comprise: determining a function used to define each neuron; determining a gradient of the function and a magnitude of the gradient for each neuron; and identifying, using the magnitude of the gradient, a neuron as making the decision for each data item. However, it will be understood this is merely one non-limiting way to determine whether a neuron is used to make a decision. Other techniques include, but are not limited to: saliency maps, gradient multiplied by input, integrated gradients, DeepLIFT, occlusion, and shapley value sampling. More generally, the techniques used to determine whether a neuron is associated with the outcome/decision may be a gradient-based attribution method or a perturbation-based attribution method.

Typically, between 8 to 20 neurons are expected to encode a particular concept within a neural network, where the neurons are spread across different layers of the network.

The technique used to identify the neurons which are associated with the outcome/decision being investigated may depend on the type of neural network. The method shown in FIG. 1 may be used to inspect any type of neural network. For example, the neural network may be any one of: a recurrent neural network, a feed forward neural network, and a convolutional neural network.

Once the neurons have been identified, the method comprises assigning, using the at least one processor, a relevance value to each identified neuron used to make the decision for each received data item (step S104). The relevance value may be determined during step S102. Steps S102 and S104 may together be termed "relevance tensor computation".

At step S106, the method comprises identifying for each received data item, using the relevance value, each neuron with a high relevance value. This step may also be termed "outlier detection".

The step of identifying each neuron with a high relevance value may comprise: performing statistical analysis, using the relevance values of each identified neuron, to identify each neuron with a high relevance value. It has been found that in each layer, the relevance of the neurons typically follows a normal distribution which exhibits a small number of outliers. It is assumed that the outliers are the only relevant neurons. For the sake of simplicity, the method may focus on only the positive outliers (i.e. those which activate neurons in an adjacent layer). However, it is possible for the method to focus on only the negative outliers (i.e. those which inhibit neurons in an adjacent layer), or for the method to consider both positive and negative outliers.

Generally speaking, the neurons which are considered to be most relevant in the making of a decision (i.e. have a high relevance value) are those which have to be changed the least to affect the activation of a neuron in an adjacent, higher layer the most. In other words, the dependency graphs for interpreting neural networks produced by the present techniques can be seen as performing a sensitivity analysis between a higher layer and a lower layer. A large positive relevance value (i.e. a high positive relevance value) means that the identified neuron contributes substantially to the activation of a neuron in a higher layer, while a large negative relevance value (i.e. a high negative relevance value) means that the identified neuron inhibits the activation of a neuron in a higher layer. The ability to identify the positively and negatively contributing neurons in a layer-by-layer manner is the first step towards understanding the internal representation structure of the neural network.

The statistical analysis to identify the outliers may comprise: calculating, using the relevance values of each identified neuron, an interquartile range; and identifying each neuron which lies outside of the interquartile range as having a high relevance value. In an example, identifying each neuron that has a high relevance value comprises identifying each neuron in a range that is equal to 1.5 multiplied by the interquartile range.

Alternatively, the statistical analysis to identify the outliers may comprise: determining, using the relevance values of each identified neuron, a Laplace distribution; and identifying each neuron which lies within five percent of the peak of the Laplace distribution as having a high relevance value. It will be understood that five percent is merely an example, non-limiting value of how to determine the high relevance neurons.

In other words, the step (S106) of identifying each neuron with a high relevance value may comprise determining the relevance of each neuron and using a statistical significance measure to filter out the neurons with the highest relevance values. Any suitable statistical significance measure may be used.

The step of identifying each neuron with a high relevance value may comprise: assigning a first binary value to each neuron indicating whether the neuron has a high relevance; and assigning a second binary value to each neuron indicating whether the neuron is positive or negative. As explained above, a high positive relevance value means that the identified neuron contributes substantially to the activation of a neuron in a higher layer, while a high negative relevance value means that the identified neuron inhibits the activation of a neuron in a higher layer.

As shown in FIG. 1, all of steps S102 to S106 are performed with respect to each data item. This is because different neurons may have been used to make the decision with respect to each data item and this is only uncovered by performing these steps with respect to each data item. The number of data items used to perform the method may depend on the dataset. For example, a minimum number of data items used to perform the method may be between 100 and 1000 data items. There is a direct linear correlation between the number of data items and the quality of the inspection and explanation of the neural network that may be provided. However, the time to perform the inspection, and the computational resources (e.g. memory and processing power), also increases with an increasing number of data items. Using more than 100,000 data items, or between 100,000 and 1,000,000 data items, may be computationally expensive and therefore, a maximum number of data items may be imposed.

Figure 4:
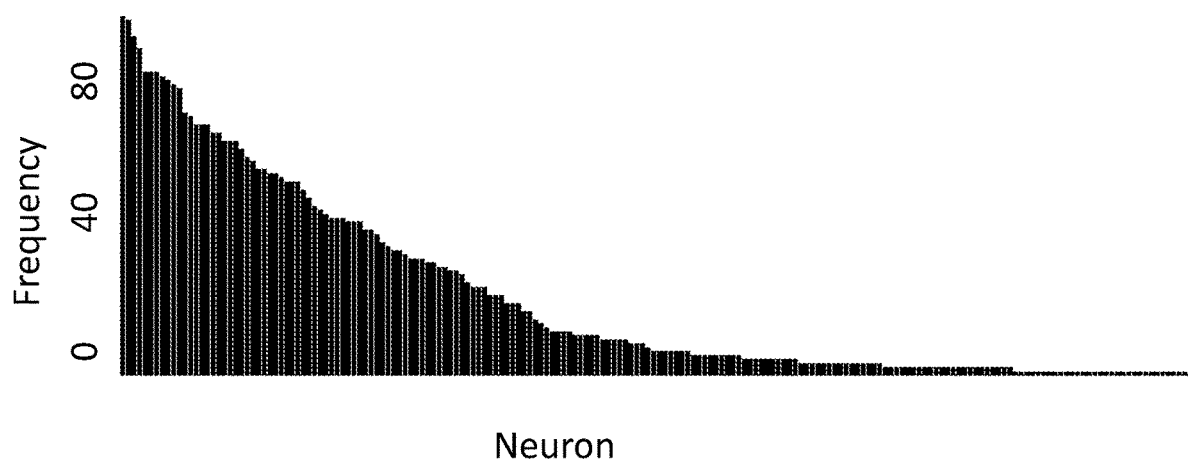
FIG. 4 shows a bar chart representing the neurons which are most often used to make a decision.
Figure 5:
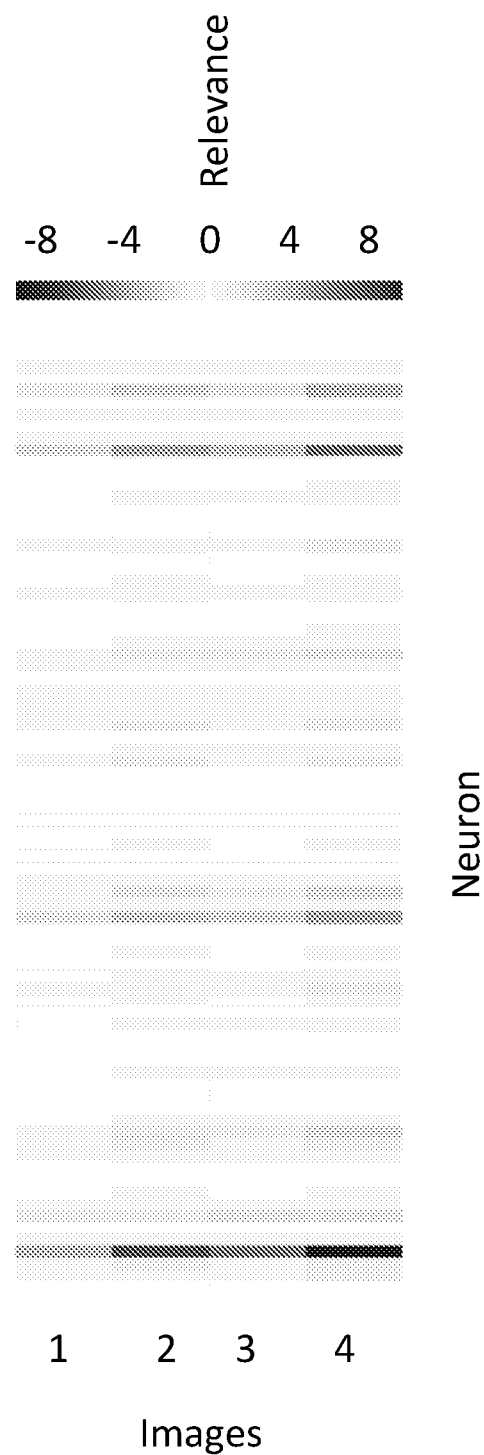
FIG. 5 shows a heatmap visualisation of the neurons which may be most frequently used in making a decision.

The next steps of FIG. 1 are performed across the data items, i.e. for the full data set. The method continues by determining, across the plurality of data items, an occurrence frequency of each neuron with a high relevance value (step S108). This step may also be known as "ranking". In other words, the high relevance value neurons may be ranked based on how often they are considered highly relevant across all of the data items. It is expected that some neurons are highly relevant in the processing of most of the data items, and that other neurons are considered highly relevant with respect to only a few data items. This step may comprise outputting a bar chart (e.g. as shown in FIG. 4) representing the occurrence frequency of each neuron with a high relevance value for each of the plurality of data items. This may make it simpler for a human user to visualise which neurons have a high relevance value and occur most frequently, i.e. to visually identify the neurons which are most often used to make the decision. Alternatively, this step may comprise outputting a heatmap showing the neurons which may be most frequently used in making a decision (e.g. as shown in FIG. 5).

The method further comprises outputting, for the decision made by the neural network, a dependency graph showing dependencies between neurons in adjacent layers of the neural network using the determined occurrence frequencies (and/or the neuron relevance values), the dependency graph enabling inspection of the neural network (step S110). The step of outputting a dependency graph may comprise: selecting, using the determined occurrence frequency, the neurons with a high relevance value which occur most frequently across all of the data items; and generating, using the selected neurons, a dependency graph between the neurons of each layer of the neural network for the decision made by the neural network.

The method may further comprise: identifying a class of the decision made by the neural network; and comparing the outputted dependency graph with a dependency graph created for at least one other class of decision. The comparison may be used to determine whether any neurons are shared between the classes. Identification of neurons that are shared between classes, and neurons that are specific to a class, may shine light on where class-specific and shared features are stored or represented with the neural network.

Figure 2:
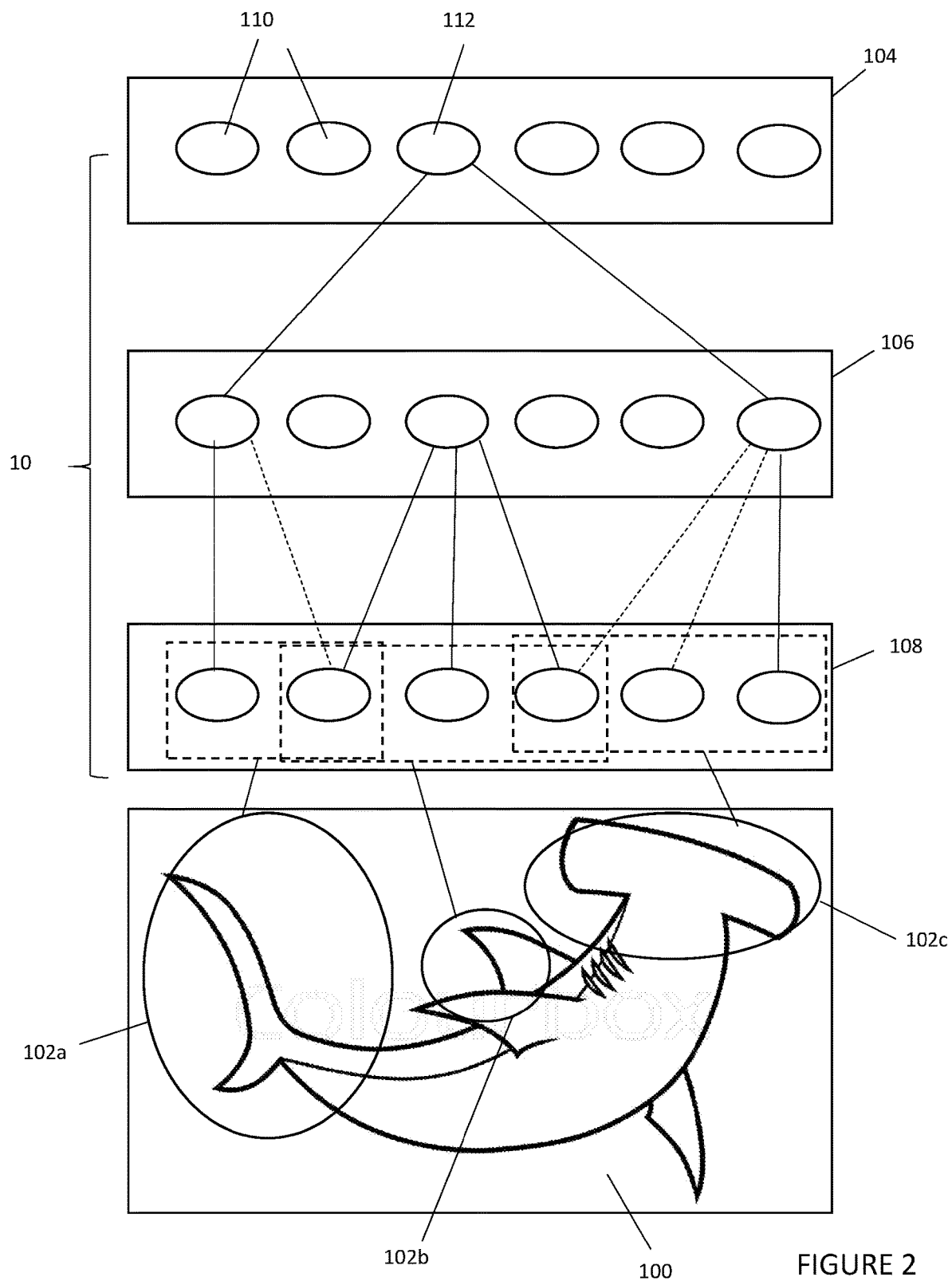
FIG. 2 is a sketch illustrating how inspection of a neural network can identify neurons used to make a decision.

The basic idea of the dependency graphs for interpreting neural networks is illustrated in FIG. 2. FIG. 2 is a sketch illustrating how inspection of a neural network 10 can identify neurons used to make a decision. Given a neural network classifier and a set of relevant neurons, the process begins from the top layer (i.e. the output layer) 104 and continues through each layer (e.g. layers 106, 108) until the input layer is reached, to identify a set of relevant of neurons in each layer which are used to make the decision.

In FIG. 2, the data item 100 is an image, and the neural network 10 may be used to perform image classification. In particular, the neural network 10 may be used to determine if image 100 contains a hammerhead shark. The neural network comprises a plurality of layers, 104, 106, 108—it will be understood that a neural network inspected using the method described herein may have any number of layers. Each layer of the neural network 10 comprises a plurality of neurons 110. The inspection method described above with respect to FIG. 1 may begin by selecting a target neuron 112 in the output layer 104 of the neural network 10 (also known as the "top layer"), which produces the final decision. Ideally, the selected neuron 112 is a neuron of the correct class. For example, if the decision being made by the neural network is determining whether or not an image shows a hammerhead shark (class), then the selected neuron (also referred to herein as the "target neuron") may be the neuron in the output layer which is concerned with the same class, i.e. identifying hammerhead sharks. Alternatively, the selected neuron may be in a broader class e.g. sharks or fish. The present techniques may make it possible to say that the concept of a shark is encoded within the neural network as a combination of features including a fin 102b, a hammerhead 102c, and a tail 102a, and which neurons are responsible for identifying particular features 102a-c. The present techniques may make it possible to determine how a hammerhead shark is encoded within the neural network relative to how a shark or fish is encoded within the same network, which may enable the neural network to be better understood and any errors to be debugged.

In other words, the dependency graph technique described herein highlights the most important neurons (as shown in FIG. 2). These neurons may then be analysed in more detail, to improve understanding of what the neurons represent specifically, and how the neural network stores information or encodes features.

Figure 3:
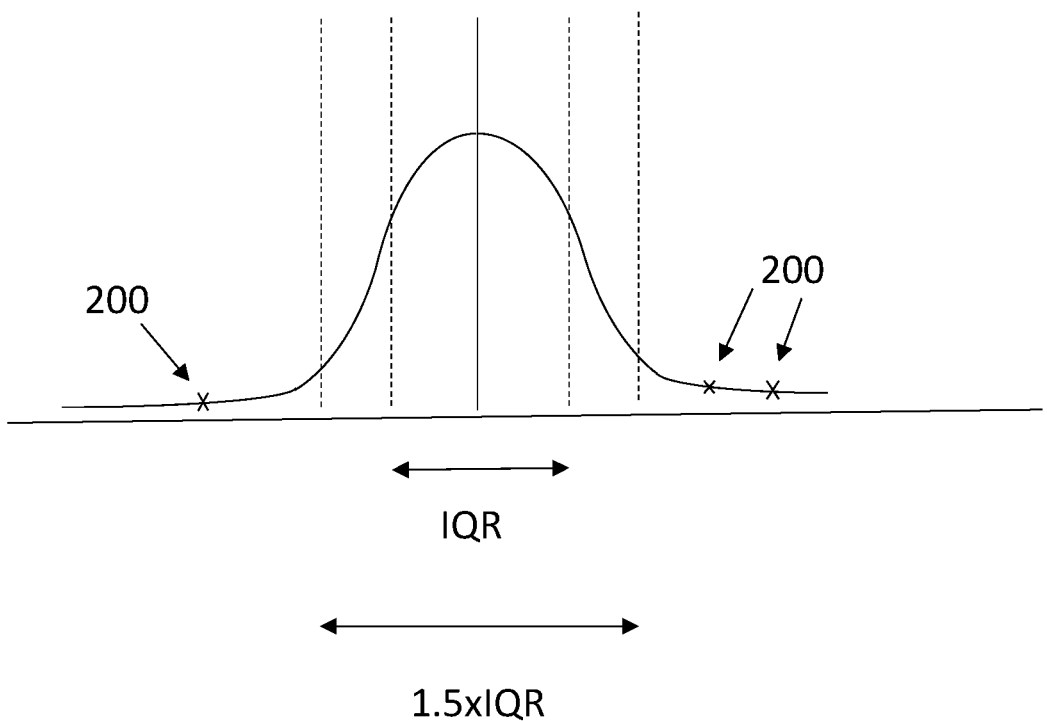
FIG. 3 shows how neurons may be identified as being important in making a decision.

FIG. 3 shows how neurons may be identified as being important in making a decision. Specifically, FIG. 3 shows the distribution of the numerically assigned neuron relevances for a layer in a neural network. The relevances are typically normally-distributed, such that statistical analysis may be used to identify outliers that are considered "important".

As mentioned above, the relevance of the neurons typically follows a normal distribution which exhibits a small number of outliers 200 (which may be around 5% of the identified neurons). It is assumed that the outliers 200 are the only relevant neurons. The statistical analysis to identify the outliers 200 may comprise: calculating, using the relevance values of each identified neuron, an interquartile range (IQR); and identifying each neuron which lies outside of the interquartile range as having a high relevance value. In an example, identifying each neuron that has a high relevance value comprises identifying each neuron that lies outside of a range that is equal to 1.5 multiplied by the interquartile range (IQR).

FIG. 4 shows a bar chart representing the neurons which are most often used to make a decision. Specifically, FIG. 4 shows the top 189 most relevant neurons of dependency graphs computed for a deep neural network using 100 images of hammerhead sharks. The frequency of a neuron represents its frequency of occurrence in the 189 corresponding dependency graphs of the 100 images.

The bar chart represents the occurrence frequency of each neuron with a high relevance value (i.e. the outliers) for each of the plurality of data items. This may make it simpler for a human user to visualise which neurons have a high relevance value and occur most frequently, i.e. to visually identify the neurons which are most often used to make the decision. It is clear from FIG. 4 that the outlier neurons are not generally identical for different input stimuli of the same class (i.e. the different data items associated with the decision). In this experiment, in which 100 images associated with hammerhead sharks was used to inspect the image classification capabilities of a neural network, 189 unique positive outliers were identified, which is 4.6% of the 4096 neurons of the original neural network. The first three outliers occur in almost all images. This indicates that the present approach is not identical to simply selecting the neurons with highest weights, which would yield constant results across the plurality of data items. On the contrary, the frequency of relevance follows a power-law distribution. This suggests that the most frequently occurring neurons could be the main "drivers" (the most pertinent) for the class activation, while the other relevant neurons pick-up nuances or modulate the main drivers. In other words, the most relevant neurons form a basis, which is transformed by the less relevant neurons.

FIG. 5 shows a heatmap visualisation of the neurons which may be most frequently used in making a decision. Specifically, the heatmap shows the assigned numerical relevance value of all the neurons within one layer with respect to four images of hammerhead sharks. The heatmap shows a magnitude of neuron relevance value for neurons in a specific layer (shown across the x-axis) computed for four different images (y axis). The four images share exactly the same number of positive and negative outliers with varying degrees of intensity. Thus, FIG. 5 is consistent with the power law distribution result mentioned above, but also shows that different images of the same class share peaks and troughs at exactly the same neurons. Effectively, for all four images, the neurons have similar relevance scores. This implies that these neurons store/encode class-specific features common to all hammerhead shark images. Consequently, the neurons with a high relevance value are likely to represent the prominent characterising features that are specific to the hammerhead shark class. It is hypothesised that FIG. 5 is a visualisation of part of the partially distributed representation for a hammerhead shark in a specific layer of the neural network.

Figure 6A:
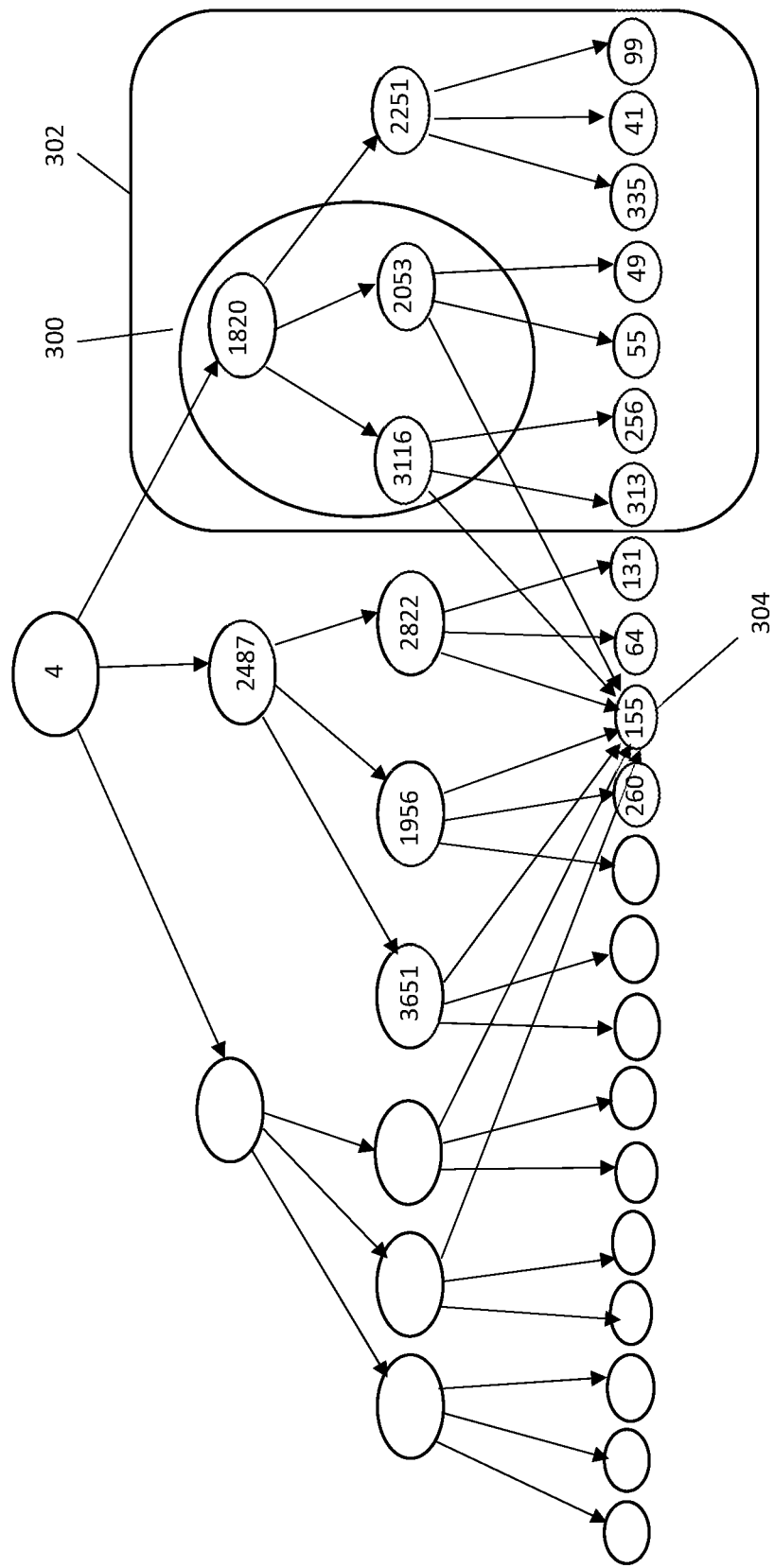
FIGS. 6A and 6B show respectively a dependency graph for a hammerhead shark class and an Egyptian cat class in the penultimate four layers of the neural network.
Figure 6B:
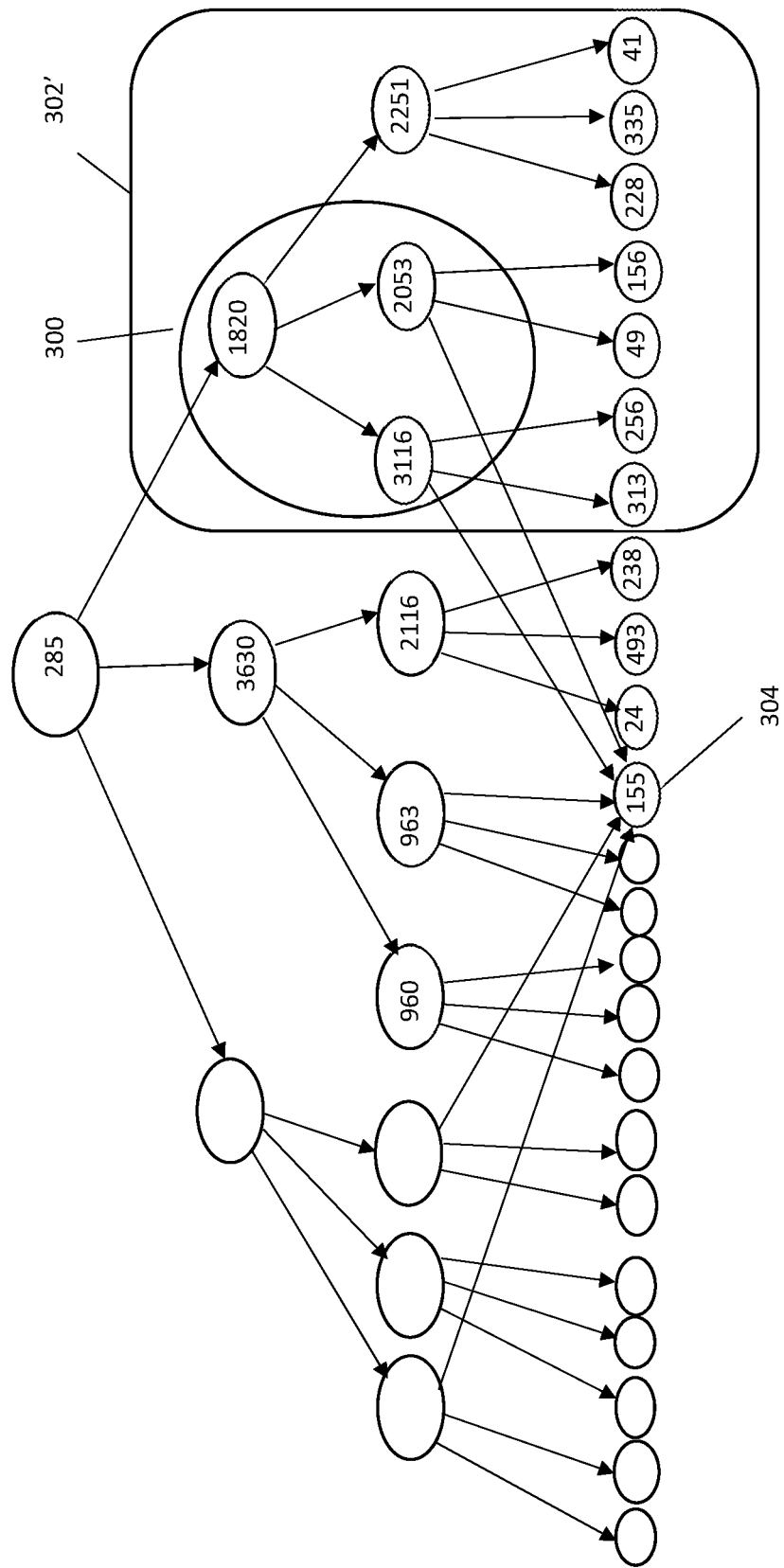

FIGS. 6A and 6B show respectively a dependency graph for a hammerhead shark class and an Egyptian cat class in the penultimate four layers of the neural network. In both dependency graphs, multiple connections are made to same neuron 304. The subgraphs indicated by rectangles 302 and 302' are also similar between the two classes. (The integers on the nodes of the dependency graphs represent the neuron indices of the neural network).

FIGS. 6A and 6B therefore illustrate two examples of the output of the present techniques, with two important observations. Firstly, it is clear that the dependency graphs for different classes may share significant similarities. For example, the subgraphs of both the hammerhead shark and Egyptian cat starting from the same neuron reveal similar neurons that have high relevance values and occur frequently (see e.g. the neurons indicated by circle 300). Interestingly, the two classes share six out of the eight most relevant neurons. This implies that the dependency graphs enable pattern matching and analysis of network motifs across classes. The shared neurons can be used to narrow down a set of neurons to inspect in more detail (using visualisation approaches, for example), in order to interpret the neurons individually. This is particularly useful for large neural networks, where inspecting each neuron is too time-consuming. In this instance, dependency graphs can be used to narrow down the search to locate important neurons representing interesting features.

Secondly, both dependency graphs share multiple incoming connections to the very same neuron 304 (which is neuron 155 in the neural network). It is surprising that this is the first time a neuron is shared within a class. Consequently, the interpretation of the dependency graph makes it possible to infer an additional relevance metric for a neuron—its inter-connectedness according to the number of incoming edges.

Therefore, the techniques described herein may enable researchers to focus analysis and interpretation efforts on the most pertinent regions of a neural network. For example, viewing either of the dependency graphs in isolation would have erroneously resulted in the belief that neuron 304 perfectly encodes either the idea of a shark or of a cat. However, the present techniques also reveal that the neuron 300 is equally important for both classes, and forms a part of a shared sub-structure. Therefore, it must encode a more abstract concept.

Figure 7:
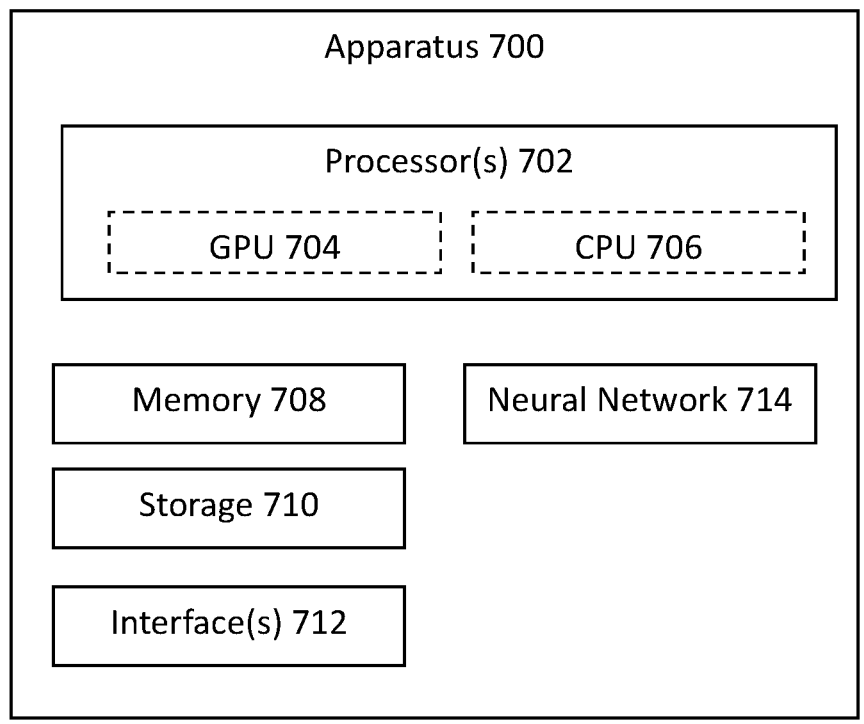
FIG. 7 is a schematic diagram of a system which may be used to implement a method to inspect a neural network.

FIG. 7 is a schematic diagram of an apparatus which may be used to implement a method to inspect a neural network. The apparatus 700 may be a computer. The apparatus 700 may be the same as that used to run or implement a neural network that is to be inspected. Thus, the apparatus 700 may comprise a neural network 714.

The apparatus 700 comprises at least one processor 702 or processing circuitry. The at least one processor 702 controls various processing operations performed by the apparatus 700, such as running/implementing the neural network. The processor 702 may comprise processing logic to process data (e.g. to run/implement neural network 714), and generate output data/signals/messages in response to the processing. The processor may comprise one or more of: a microprocessor, a microcontroller, and an integrated circuit.

The processor 702 may comprise a graphics processing unit (GPU) 704 and/or a central processing unit (CPU) 706. In some cases, e.g. for inspecting neural networks used to classify images, steps S102 to S106 of FIG. 1 may be performed on a GPU 704, while steps S108 and S110 may be performed on a CPU 706. Steps S102 to S106 may be performed for all the input images/data items on the GPU 704 before steps S108 and S110 are performed on the CPU 706, for computational efficiency.

The apparatus 700 may comprise memory 708. The memory 708 may comprise a volatile memory, such as random access memory (RAM), for use as temporary memory, and/or non-volatile memory such as Flash, read only memory (ROM), or electrically erasable programmable ROM (EEPROM), for storing data, programs, or instructions, for example.

The apparatus 700 may comprise storage 710. The storage 710 may store the data items which have been processed by the neural network 714 and are associated with one or more decisions made by the network. Alternatively, the data items may be stored in an external data storage (not shown).

The apparatus 700 may comprise one or more interfaces 712 that enable the apparatus 700 to receive inputs and/or generate outputs (e.g. to receive the user defined target neuron, to display the output dependency graph, etc.) For example, the apparatus 700 may have a display screen to enable information to be displayed on the apparatus and for a user to enter data into the apparatus.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What is claimed is:

1. A computer-implemented method of classifying images, using an image classification neural network that receives a plurality of image data items as an input and provides an image classification decision for each of the plurality of image data items, the method comprising:
    using an image classification neural network to classify a plurality of image data items and provide an image classification decision for each of the plurality of image data items;
    obtaining a subset of the plurality of image data items that are all associated with a same image classification decision;
    identifying a plurality of neurons in each layer of the image classification neural network used to make the image classification decision for each image data item of the subset;
    assigning a relevance value to each identified neuron used to make the image classification decision for each image data item of the subset;
    identifying for each image data item of the subset, using the relevance value, each neuron with a high relevance value;
    determining, across the subset of data items, an occurrence frequency of each neuron with a high relevance value;
    determining, for the image classification decision made by the image classification neural network, a dependency graph showing dependencies between neurons in adjacent layers of the image classification neural network using the determined occurrence frequencies; and
    generating a graphical user interface using the dependency graph to visualize a magnitude of the relevance value for each neuron with a high relevance value as applied to a plurality of images, the graphical user interface configured to enable evaluation of the performance of the image classification neural network.

2. The method of claim 1 wherein the step of identifying a plurality of neurons in each layer of the neural network comprises:
    identifying a plurality of neurons in an output layer of the neural network; and
    identifying, based on the identified neurons in the output layer, a plurality of neurons in a subsequent layer of the neural network.

3. The method of claim 1 wherein the step of identifying a plurality of neurons in each layer of the neural network comprises:

using a plurality of neurons identified in a first layer of the neural network to identify a plurality of neurons in a second layer of the neural network.

4. The method of claim 1 wherein the step of identifying a plurality of neurons in each layer of the neural network comprises:
    determining a function used to define each neuron;
    determining a gradient of the function and a magnitude of the gradient for each neuron; and
    identifying, using the magnitude of the gradient, a neuron as making the decision for each data item.

5. The method of claim 1 wherein the step of assigning a relevance value to each identified neuron comprises:
    assigning a numerical relevance value to each identified neuron used to make the decision.

6. The method of claim 1 wherein the step of identifying each neuron with a high relevance value comprises:
    performing statistical analysis, using the relevance values of each identified neuron, to identify each neuron with a high relevance value.

7. The method of claim 6 further comprising:
    calculating, using the relevance values of each identified neuron, an interquartile range; and
    identifying each neuron which lies outside of the interquartile range as having a high relevance value.

8. The method of claim 7 further comprising:
    identifying each neuron which lies outside of a range that is equal to 1.5 multiplied by the interquartile range as having a high relevance value.

9. The method of claim 6 further comprising:
    determining, using the relevance values of each identified neuron, a Laplace distribution; and
    identifying each neuron which lies within five percent of the peak of the Laplace distribution as having a high relevance value.

10. The method of claim 6 further comprising:
    assigning a first binary value to each neuron indicating whether the neuron has a high relevance; and
    assigning a second binary value to each neuron indicating whether the neuron is positive or negative.

11. The method of claim 1 wherein the step of determining an occurrence frequency comprises:
    outputting a bar chart representing the occurrence frequency of each neuron with a high relevance value for each of the plurality of data items.

12. The method of claim 1 wherein the step of determining a dependency graph comprises:
    selecting, using the determined occurrence frequency, the neurons with a high relevance value which occur most frequently; and
    generating, using the selected neurons, a dependency graph between the neurons of each layer of the neural network for the decision made by the neural network.

13. The method of claim 1 further comprising:
    identifying a class of the decision made by the neural network; and
    comparing the outputted dependency graph with a dependency graph created for at least one other class of decision.

14. The method of claim 13 further comprising:
    determining, using the comparing, whether any neurons are shared between the classes.

15. The method of claim 1 wherein the neural network is any one or more of: a recurring neural network, a feed forward neural network, and a convolutional neural network.

16. The method of claim 1 wherein evaluation of the neural network is used for any one or more of: optimisation of the neural network, debugging the neural network, monitoring the neural network, adjusting the neural network in view of new information, and auditing the neural network.

17. The method of claim 1 further comprising:
    identifying, using the outputted dependency graph, each feature used to make the image classification decision, and the neurons which encode each feature.

18. The method of claim 1 further comprising providing an indication of the performance of the image classification neural network to a user.

19. The method of claim 1, wherein the graphical user interface includes a heatmap to visualize the magnitude of the relevance value.

20. A non-transitory computer-readable device having instructions stored thereon that, when executed by at least one computing device, cause the at least one computing device to perform operations comprising:
    using an image classification neural network which receives a plurality of image data items as an input to classify the plurality of image data items and provide an image classification decision for each of the plurality of image data items;
    obtaining a subset of the plurality of image data items that are all associated with a same image classification decision;
    identifying a plurality of neurons in each layer of the image classification neural network used to make the image classification decision for each image data item of the subset;
    assigning a relevance value to each identified neuron used to make the image classification decision for each image data item of the subset;
    identifying for each image data item of the subset, using the relevance value, each neuron with a high relevance value;
    determining, across the subset of data items, an occurrence frequency of each neuron with a high relevance value;
    determining, for the image classification decision made by the image classification neural network, a dependency graph showing dependencies between neurons in adjacent layers of the image classification neural network using the determined occurrence frequencies; and
    generating a graphical user interface using the dependency graph to visualize a magnitude of the relevance value for each neuron with a high relevance value as applied to a plurality of images, the graphical user interface configured to enable evaluation of the performance of the image classification neural network.

* * * * *